(12) United States Patent
Cox et al.

(10) Patent No.: US 9,193,449 B2
(45) Date of Patent: Nov. 24, 2015

(54) METHOD FOR OPTIMIZING OPERATION OF AIRCRAFT GROUND TRAVEL DRIVE SYSTEM

(75) Inventors: Isaiah W. Cox, Baltimore, MD (US); Jonathan Sidney Edelson, Portland, OR (US); Nechama Cox, Baltimore, MD (US)

(73) Assignee: Borealis Technical Limited, Gibraltar (GI)

( * ) Notice: Subject to any disclaimer, the term of this patent is extended or adjusted under 35 U.S.C. 154(b) by 178 days.

(21) Appl. No.: 13/591,328

(22) Filed: Aug. 22, 2012

(65) Prior Publication Data

US 2014/0336847 A1 Nov. 13, 2014

Related U.S. Application Data

(60) Provisional application No. 61/526,138, filed on Aug. 22, 2011.

(51) Int. Cl.
*B64C 25/40* (2006.01)
*B64C 19/00* (2006.01)

(52) U.S. Cl.
CPC .............. *B64C 25/405* (2013.01); *B64C 19/00* (2013.01); *Y02T 50/823* (2013.01)

(58) Field of Classification Search
CPC .............................. B64C 25/405; B64C 19/00
USPC ........... 701/3, 120; 244/50, 51, 100 R, 100 S, 244/102 A, 102 R, 103, 103 R, 103 S
See application file for complete search history.

(56) References Cited

U.S. PATENT DOCUMENTS

| | | | |
|---|---|---|---|
| 6,657,334 B1 | 12/2003 | Edelson | |
| 6,838,791 B2 | 1/2005 | Edelson | |
| 7,116,019 B2 | 10/2006 | Edelson | |
| 7,226,018 B2 | 6/2007 | Sullivan | |
| 7,445,178 B2* | 11/2008 | McCoskey et al. | 244/50 |
| 7,469,858 B2 | 12/2008 | Edelson | |
| 7,975,960 B2 | 7/2011 | Cox | |
| 8,220,740 B2 | 7/2012 | Cox et al. | |
| 2008/0147252 A1* | 6/2008 | Bayer | 701/3 |
| 2009/0261197 A1* | 10/2009 | Cox et al. | 244/50 |
| 2009/0294577 A1 | 12/2009 | Roques et al. | |
| 2012/0018574 A1* | 1/2012 | Bayer | 244/50 |
| 2012/0217339 A1* | 8/2012 | Gilleran et al. | 244/50 |

FOREIGN PATENT DOCUMENTS

WO 2006138267 A2 12/2006

\* cited by examiner

*Primary Examiner* — Muhammad Shafi
*Assistant Examiner* — Majdi Alsomiri

(57) ABSTRACT

A method is provided for automatically or manually optimizing independent ground travel operation in an aircraft equipped with one or more self-propelled nose or main wheels powered by a driver means, wherein selected operating parameters indicative of optimized ground travel are monitored by sensors or detectors to provide data and information relating to the selected parameters during operation of the ground travel system. Selected operating parameters can include, for example, speed, direction of travel, torque, component thermal data, aircraft location data, and operator inputs, commands, and feedback, as well as other operational data or information. Data is collected, recorded, and analyzed to enable changes to be made to the ground travel system components in real time automatically by intelligent software or manually by a system operator or at a later time to ensure optimum operation of the system.

13 Claims, 2 Drawing Sheets

METHOD FOR OPTIMIZING OPERATION OF AIRCRAFT GROUND TRAVEL DRIVE SYSTEM

PRIORITY CLAIM

This application claims priority from U.S. Provisional Patent Application No. 61/526,138, filed 22 Aug. 2011, the disclosure of which is fully incorporated herein.

TECHNICAL FIELD

The present invention relates generally to the operation of self-propelled aircraft drive systems during ground travel and specifically to a method for ensuring optimized efficient operation of a powered self-propelled drive system designed to move an aircraft during ground travel.

BACKGROUND OF THE INVENTION

The operation of airlines and airports today focuses on achieving maximum efficiency to keep operating costs as low as possible while continuing to provide travelers with a safe and economical mode of travel. Arriving and departing aircraft must travel on the ground between landing and subsequent takeoff along runways and taxiways associated with an airport. It is acknowledged that many, if not most, delays in aircraft arrivals and departures result from delays in aircraft ground travel between landing and takeoff. It is additionally acknowledged that minimizing the time an aircraft spends sitting idle on the ground between taxi-in after landing and taxi-out prior to takeoff maximizes airline and airport savings. At many airports, space is constrained. Aircraft that are waiting to be towed or pushed back block the ramp area and taxiways, delaying the movement of incoming aircraft into the gate and blocking the transit of ground vehicles. It is desired to keep the time an aircraft spends on the ground at an airport between landing, arrival at and departure from a gate, and take-off to the minimum required to unload arriving passengers and cargo, service the aircraft, load departing passengers and cargo, and move the aircraft to and from the gate. Minimizing aircraft ground time not only reduces delays in airline flight schedules, but also increases the possibility that an airline can schedule additional flights, providing travelers with more options and improving airline profits.

The ground movement of landing aircraft is currently controlled by the aircraft's main engines until the aircraft reaches an arrival parking location. Upon departure, the aircraft is typically pushed away from its parking location by a tow vehicle to a more distant location where the engines can be started and used to move the aircraft to a runway for takeoff. The use of an aircraft's engines to move an aircraft at taxi speeds on the ground presents several challenges, including the dangers posed to persons and vehicles in the vicinity by jet blast and engine ingestion. Additionally, engine useful life may be shortened, not only by damage from foreign object debris, but also from sustained operation at the low speeds required for ground travel.

The use of vehicles that tow an aircraft a greater distance onto a runway than the distances traveled by currently available tugs or tow vehicles has been proposed. While this may diminish somewhat the use of an aircraft's engines during taxi, it does not necessarily shorten the time the aircraft spends on the ground and requires the maneuvering of additional vehicles and the personnel to attach and detach these vehicles from aircraft on already crowded runway and taxiway space.

Moving an aircraft on the ground during taxi by means other than the aircraft's main engines or turbines has been described in the art. U.S. Patent Publication No. US2009/0294577 to Rogues et al, for example, describes a device that enables an aircraft to move autonomously on the ground that employs a very specifically defined spiral drive gear to turn an aircraft wheel. The torque and speed of the wheel driver may be controlled according to parameters from other aircraft systems. Processing data relating to the operation of the device and making the required adjustments automatically, or even manually, to achieve optimized operation or performance is not suggested, however. In U.S. Pat. No. 7,445,178 and PCT Patent Publication No. WO2006/138267, McCoskey et al describe a powered nose aircraft wheel system useful in a method of taxiing an aircraft that can minimize the assistance needed from tugs and the aircraft engines. A precision guidance system including ground elements that interact with aircraft elements is disclosed for controlling movement of the aircraft on the ground during taxi. McCoskey et al, however, is completely silent with respect to whether the performance of this powered nose wheel could be optimized in any way to provide efficient aircraft ground movement and, if so, how that might be accomplished. U.S. Pat. No. 7,226,018 to Sullivan also describes a wheel motor useful in an aircraft landing gear wheel designed to provide motive force to an aircraft wheel when electric power is applied. Sullivan also fails to suggest any method for optimizing the performance and efficiency of the described wheel motor to move the aircraft effectively on the ground. U.S. Pat. Nos. 7,975,960 and 8,220,740, both to Cox et al and owned in common with the present application, describe a nose wheel control apparatus capable of driving a taxiing aircraft without the use of the aircraft main engines or tow vehicles. A method for automatically or manually optimizing the efficiency and performance of this apparatus is not suggested, however.

It would be highly desirable to be able to obtain and analyze information relating to the operation of an aircraft ground travel system and then make any required system adjustments automatically, or even manually, to optimize the efficiency and performance of aircraft ground travel. It would be desirable as well to utilize fully the benefits of a powered aircraft drive wheel capable of moving an aircraft efficiently during ground travel without engines or tow vehicles in optimizing ground travel system performance. The prior art has not provided a method for automatically or manually optimizing the performance and efficient operation of an aircraft ground travel system that employs one or more drive aircraft nose or main wheels powered by one or more onboard drivers to effectively move an aircraft independently on the ground.

SUMMARY OF THE INVENTION

It is a primary object of the present invention, therefore, to overcome the deficiencies of the prior art and to provide a method for automatically or manually optimizing the performance and efficient operation of an aircraft ground travel system that employs one or more aircraft nose or main drive wheels powered by one or more onboard drivers to effectively move an aircraft independently on the ground.

It is an additional object of the present invention to provide a method for optimizing the operation and performance of a powered aircraft drive wheel ground travel system that includes software capable of receiving data relating to system operation and performance and intelligently automatically adapting the system to optimize operation and performance.

It is another object of the present invention to provide a method for automatically optimizing the operation of an aircraft ground travel system with one or more powered self-propelled drive wheels that monitors and analyzes selected operating parameters to determine whether the system is operating within desired optimum parameter ranges and automatically adjusts the system to operate within the selected parameters as required.

It is another object of the present invention to provide a method for optimizing the operation and performance of a powered aircraft drive wheel ground travel system that receives and analyzes data relating to system operation and performance and transmits the data to a system operator for manually modifying the system to optimize operation and performance.

It is a further object of the present invention to provide a method for optimizing the operation and performance of a powered aircraft drive wheel ground travel system that receives and analyzes data relating to system operation and performance so that the system can be modified to optimize operation and performance in real time or at a future time, regardless of whether the system is actually in operation.

It is yet another object of the present invention to provide a method for monitoring, recording, and analyzing operational data relating to the operation and performance of a powered self-propelled aircraft drive wheel ground travel system to improve and optimize ground travel system operation, as well as airport throughput, aircraft ramp safety, aircraft utilization, and aircraft operating block time.

It is yet a further object of the present invention to provide a method for analyzing data relating to the operation and performance of a powered self-propelled aircraft drive wheel ground travel system to improve the future use, operation, and design of the system.

It is a still further object of the present invention to provide a method for optimizing the operation of an aircraft ground travel system with one or more powered drive wheels that are functionally integrated with existing aircraft electronic data systems.

In accordance with the aforesaid objects, a method is provided for automatically or manually optimizing the performance and efficient operation of an aircraft ground travel system that employs one or more aircraft nose or main drive wheels powered by one or more onboard drivers to effectively move an aircraft independently on the ground. The present method is intended to be used in connection with an aircraft that is equipped with a ground travel system including one or more powered drive wheels capable of effectively moving the aircraft during ground travel independently without the use of the aircraft's engines or external tow vehicles. In accordance with the present method, an aircraft is provided with a ground travel system including one or more drive wheels, each powered by an electric, hydraulic, or other driver or drive means capable of propelling the aircraft during ground travel. Each of the drive wheels and drivers or other system components is provided with a plurality of sensors and/or detectors for obtaining information about the operation and performance of the drive wheel, driver, or other system components while the aircraft is moving on the ground. The sensed and detected operational information and data is recorded and collected by a processor, and the collected operational data is reviewed and analyzed to determine whether the ground travel system is operating within selected optimal system operating parameters. If the actual system operating parameters are not within the selected optimum system operating parameters, appropriate adjustments can be made automatically or manually in real time by intelligent software or by a system operator, or information can be stored for analysis at a later time so that the system can be modified as required to operate with optimum efficiency irrespective of whether the system is actually in operation. A variety of system parameters could be monitored and analyzed to optimize system operation. Some preferred operational parameters include wheel and/or driver speed, wheel and/or driver torque, direction of aircraft travel, component thermal data, aircraft location data, global positioning system (GPS) data, all system operator inputs, commands, and feedback, all system or component pings, and the like, although any desired operational data could also be monitored and analyzed to optimize operation.

Other objects and advantages will be apparent from the following description, drawings, and claims.

DESCRIPTION OF THE INVENTION

A powered aircraft drive wheel, which can be a powered nose drive wheel or a powered aircraft main drive wheel, is uniquely positioned to maneuver an aircraft in a variety of circumstances on the ground without assistance from the aircraft's engines or external vehicles. The terms "drive wheels" and "self-propelled drive wheels," as used herein, refer to any aircraft wheels that are connected to and powered or driven by a driver or a drive means. A driver or drive means for a powered drive wheel optimally exerts sufficient power to propel or move the aircraft at runway speeds, and its small size enables the driver to fit within a nose wheel or main wheel landing gear space or in any other convenient onboard location inside or outside the wheel, without limitation. An aircraft with a powered self-propelled nose wheel or other aircraft wheel, such as a main wheel, will have one or more wheel drivers mounted in driving relationship with one or more of the aircraft wheels to move the wheels at a desired speed and torque.

Wheel drivers or drive means useful for self-propelled drive wheels may be selected from those known in the art. One wheel driver preferred for this purpose is a high phase order electric motor of the kind described in, for example, U.S. Pat. Nos. 6,657,334; 6,838,791; 7,116,019; and 7,469,858, all of which are owned in common with the present invention. A geared motor, such as that shown and described in U.S. Pat. No. 7,469,858, is designed to produce the torque required to move a commercial sized aircraft at an optimum speed for ground movement. The disclosures of the aforementioned patents are incorporated herein by reference, Any form of motor capable of driving an aircraft on the ground during ground travel, including but not limited to electric induction motors, permanent magnet brushless DC motors, switched reluctance motors, hydraulic pump/motor assemblies, and pneumatic motors, may also be used to power drive wheels loan aircraft ground travel system. Other motor designs capable of high torque operation across a desired speed range that can be integrated into an aircraft nose or main gear drive wheel to function as described herein may also be suitable for use in the aircraft ground movement system of the present invention.

Figure 1:
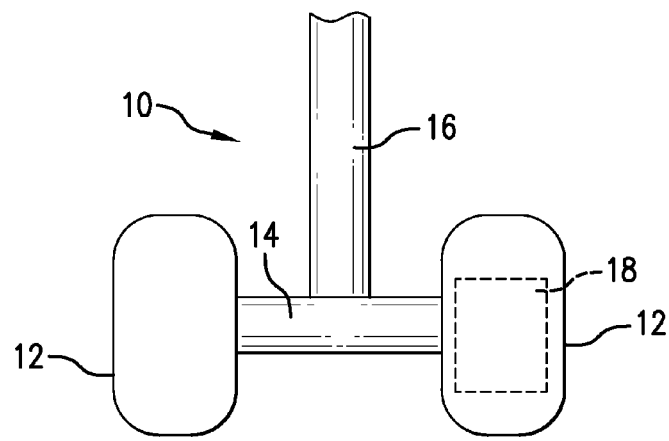
FIG. 1 illustrates a diagram of a set of aircraft self-propelled wheels powered by one or more electric drivers in accordance with the present invention.

Referring to the drawings, FIG. 1 diagrammatically illustrates an aircraft nose or main landing gear assembly 10. The nose or main landing gear assembly 10 includes a pair of wheels (not directly shown), on each of which is mounted a tire 12. The wheels are rotatably mounted on an axle 14 supported by a strut 16 connected to aircraft landing gear structures within the body of an aircraft (not shown). In the nose or main gear assembly 10 shown in FIG. 1, a wheel driver 18 is mounted on the axle 14. Although the driver 18 is shown mounted in one preferred position within a wheel, any other convenient mounting position for the driver 18 relative to the wheels is contemplated to be within the scope the present invention. The driver can be mounted adjacent to a wheel, outside a wheel or in any convenient onboard location on the aircraft, without limitation. Additionally, although a single driver 18 is shown mounted within a wheel in FIG. 1, a pair of drivers 18 may be mounted, one within each of a pair of wheels, adjacent to the wheels or entirely outside the wheels in another onboard location, to provide additional power in a powered self-propelled aircraft ground travel system. A driver could also be located anywhere in or attached anywhere on the aircraft's airframe. Mounting one or more drivers to power one or more nose wheels in these locations will be preferred in some applications. One or more drivers could also be mounted in the described locations to power one or more of the aircraft main wheels.

The method of the present invention enables the automatic optimization of the ground travel system in accordance with selected operating parameters by providing software capable of analyzing information relating to the selected parameters and automatically adjusting the system as needed to optimize operation. The system adjustment occurs automatically, and the pilot or other flight crew personnel are not necessarily aware of its occurrence. It is also possible to optimize the efficient operation of a ground travel system wheel drive system including the wheel drive shown in FIG. 1 manually. In both cases, optimization is achieved by providing sensors, detectors, and other means to collect data and in about selected operations of the powered ground travel system and, ultimately, to analyze, this data to determine whether operation of the ground travel system is optimized within selected operating parameters relating to the selected operations.

The terms "optimize," "optimization," "optimum," "optimal," and the like, as used herein in connection with an aircraft ground travel system, refer to operating parameter ranges and actions taken to make the system function as perfectly and effectively as possible. A wide range of parameters to be monitored and analyzed can be selected to ensure optimized system operation. Some preferred selected operating parameters include, for example without limitation, wheel and/or driver speed, wheel and/or driver torque, direction of travel, component thermal data, aircraft location data, global positioning system (GPS) data, wheel electronic data, all system operator inputs and commands, all feedback to operator, system or component pings, boot checks, status checks, and the like. Any other aircraft ground travel drive system or component operational data could also be monitored and analyzed, however.

Optimized operation and performance of the aircraft ground travel system described herein is intended to encompass a range of operations and performance involving and relating to this aircraft ground travel system. Optimized system operation and performance will preferably relate primarily to the aircraft powered self-propelled drive system. The optimized operation of an aircraft ground travel system will, in addition, optimize other ground travel system functions, including, but not limited to, airport throughput, aircraft ramp safety, aircraft utilization, and aircraft operating block time. While operating performance may be the main ground travel system characteristic to be optimized, any other desired system characteristic, such as, for example, system longevity and/or available power could also be optimized in accordance with the present method.

Figure 2:
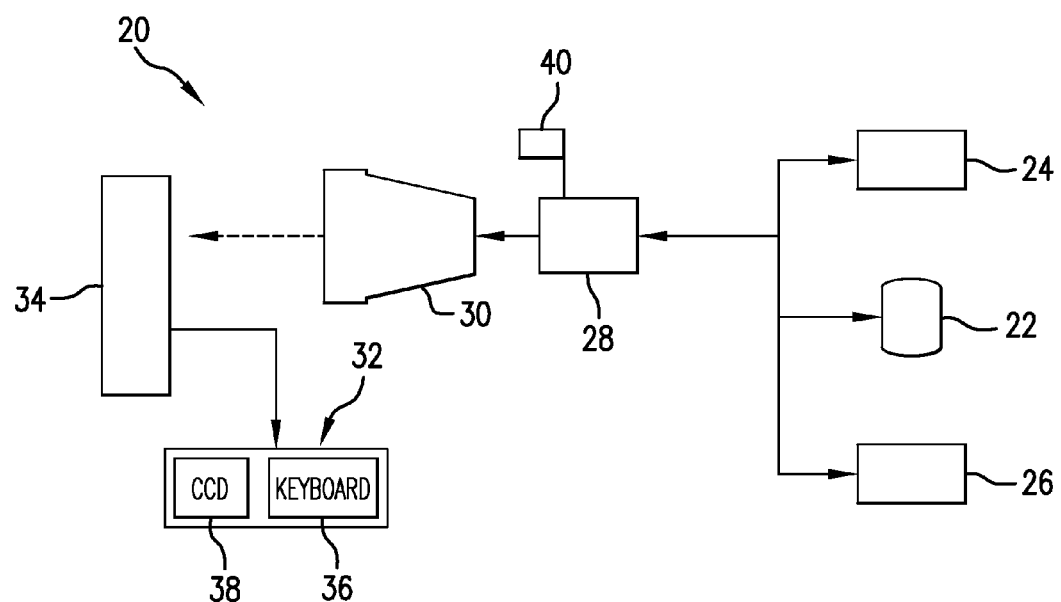
FIG. 2 is a functional block diagram of one variation of an aircraft ground travel system usable with the performance optimization method of the present invention.

An example of one mode of operation of an aircraft powered self-propelled ground travel system 20 in accordance with the present invention is illustrated as a functional block diagram in FIG. 2. The aircraft ground travel system 20 includes at least one aircraft wheel 22, which can be a nose wheel or a main wheel, a driver 24, operably mounted in a selected onboard location as described above, to power the wheel 22, a plurality of sensors and/or detectors 26, a processor 28, an optional display device 30 and an optional operator interface 32. The wheel 22 and driver 24 may also include electronic components that should preferably be integrated into the ground travel system electronics. The operator interface 32 may be manipulated by an operator 34. The processor 28 is preferably capable of collecting data relating to wheel, driver, and other ground travel system component performance communicated by the sensors or detectors 26, recording the data, storing the data, analyzing the data to compare actual performance parameters to selected optimized performance parameters, and, optionally, transmitting the data to a display device, such as display 30, to be read by the operator 34, who may be a pilot or other member of an aircraft's flight crew. The display device 30 may be a visual display that communicates the required system performance information, although other display devices, indicated at 40, such as lights, sounds, or both, could also be provided.

The display 30, operator interface 32, and operator 34 could also be located in an interior part of the aircraft other than the flight deck or in an exterior location remote from the aircraft. The operator interface 32 is preferably in operative communication with the processor 28 and other aircraft electronic systems, as required, and is designed to receive input from the pilot or other operator. In response to operator input, command signals may be supplied to the processor 28, to the driver 24, and to any other components, as required, to make any necessary changes in operation of the driver 24 or wheel 22 and, therefore, in operation of ground travel of the aircraft. It is contemplated that operative communications between components of the ground travel drive system of the present invention could be wireless and/or wire-enabled.

Preferably, the processor 28 will include intelligent software, and the ground travel system will be automatically adjusted to optimize operation. In this case, the display 30 and operator interface 32 shown in FIG. 2 may not be required and, in that case, will not be part of the ground travel system. The pilot or other operator is not necessarily informed when the system automatically adjusts, although it is contemplated that some type of system indicator would be provided to accomplish this. A visual or audible indicator 40, such as, for example, a light or a specific audio tone, could be supplied to provide a warning or other indication of a system adjustment requiring attention or for any other desired purpose.

The operator interface 32 may be any one of a number of available user interface devices and may include a keyboard 36 and/or a cursor control device (CCD) 38, such as, for example a mouse, trackball, joystick, and the like. The CCD will typically move a cursor on a screen on the display device 30, and the keyboard 36 will permit the operator to input information in response to data relating to the operation of the ground travel system transmitted to the display by the processor 28. When the ground travel system is provided with intelligent software that adjusts or modifies the system to produce optimization automatically, an operator interface 32 is not required, but is preferably provided to enable manual override of an automatic system adjustment in the event this is necessary.

Most of the data received and analyzed by the processor 28 will be transmitted by the sensors or detectors 26 that are monitoring the operating parameters on the driver 24, wheel 22, and any other selected system components. As noted above, data connections can be set up to use conventional electronic communication wires, or they can be wireless. Data transmission can also occur by physical transmission, including, for example, by using an onboard memory device, which is removed and replaced periodically.

Information and data that relate to the efficient operation of the ground travel system 20, especially as optimized operation relates to airport throughput, aircraft ramp safety, aircraft utilization, and the like, could also be supplied to the processor wirelessly by sources external to the aircraft. These sources could include, for example, a global positioning system (GPS), a weather data source, a terrain avoidance and warning system (TAWS), and a runway awareness and advisory system (RAAS), among others.

The processor 28 is preferably designed at least to receive, analyze, process, store, and transmit information gathered by the driver 24 and/or wheel 22 sensors or detectors 26 relating to the operating parameters of the aircraft ground travel system. To accomplish this, the processor 28 may include any number of individual microprocessors, flight and/or navigation computers or equipment, memory devices, storage devices, interface cards, and other components known in the art for this purpose. The processor additionally includes the software needed to optimize the performance of the aircraft ground travel system in accordance with the present method. Preferably this software is capable of taking the collected data and intelligently automatically adapting the ground travel system for optimized operation and performance, system longevity, available power, or any other desired system characteristics. The processor 28 and other system electronics are designed to communicate with and/or be integrated into existing aircraft electronic systems. Other components, for example the driver, sensors, user interface, and display, may also require appropriate microprocessor and like elements as well as software to enable communication among these components of the ground travel system and the processor 28 and other system components.

The plurality of sensors or detectors 26 communicate between the driver 24, wheel 22, and the processor 28 to gather and provide information relating to the operation of the driver and the wheel as the aircraft is propelled on the ground by one or more powered drive wheels. Preferred operating parameters monitored by sensors or detectors are many and include, for example, wheel and/or driver speed, wheel and/or driver torque, direction of aircraft travel, component thermal data, aircraft location data, global positioning system (GPS) data, wheel electronic data, all operator inputs and commands, all feedback to operator, all system or component pings, all boot checks, all status checks, and the like. Any other desired operational information related to the operation of the aircraft's independent ground travel system during ground movement of the aircraft could also be monitored and analyzed. The specific time period when the selected parameters are monitored can vary from an established set time period to the entire time the aircraft uses the ground travel system after landing and/or prior to takeoff. Information from existing aircraft electronic systems, as required, is also preferably integrated with the data from the ground travel system to ensure effective system optimization.

If the ground travel system is not provided with intelligent software that automatically adjusts the system to ensure optimization, the information and data relating to the operation of the selected operating parameters of the ground travel system, as noted above, may be transmitted to a pilot or other aircraft personnel responsible for receiving this information. The information will be used to adjust semi-automatically or manually the performance of the driver, wheel, or other components of the aircraft ground travel system for optimum drive system performance or to optimize other characteristics, including system longevity, available power, and the like.

When the system is equipped with intelligent software to make it fully automatic, any system adjustments would be done automatically to adapt the system for optimized performance. If, for example, the thermal detectors or sensors indicate that the driver or wheel temperature exceeds optimum operating parameters, that information would be sent to the processor, where it would be analyzed. The ground travel system is configured to respond automatically by taking the required action that would reduce the temperature so that the system would again be operating optimally. The thermal data could be used to modify the software as background activity. For example, instead of generating 100% torque at "full" torque command from the pilot, a modified system might command only 50% torque.

If the system does not include intelligent software and is not fully automatic, it is contemplated that, upon receiving the system performance data, preferably by way of the displays 30 or 40, the pilot or other operator 34 could use the CCD and/or keyboard components of the operator interface 32 to direct manually changes in the ground travel system operating parameters to optimize the performance of the system in response to specific situations in real time. The ground travel system could also be configured more simply to collect data relating to operating parameters from the sensors and record the data for analysis and review at a later time. The collected data would be reviewed to provide an overall review of the ground travel system operation characteristics to improve the way the system is used, operated, and/or designed. In this case, there would be no need for a display device or a user interface, since the system operating information would be collected and stored in the processor or a functionally similar component until required for analysis.

Figure 3:
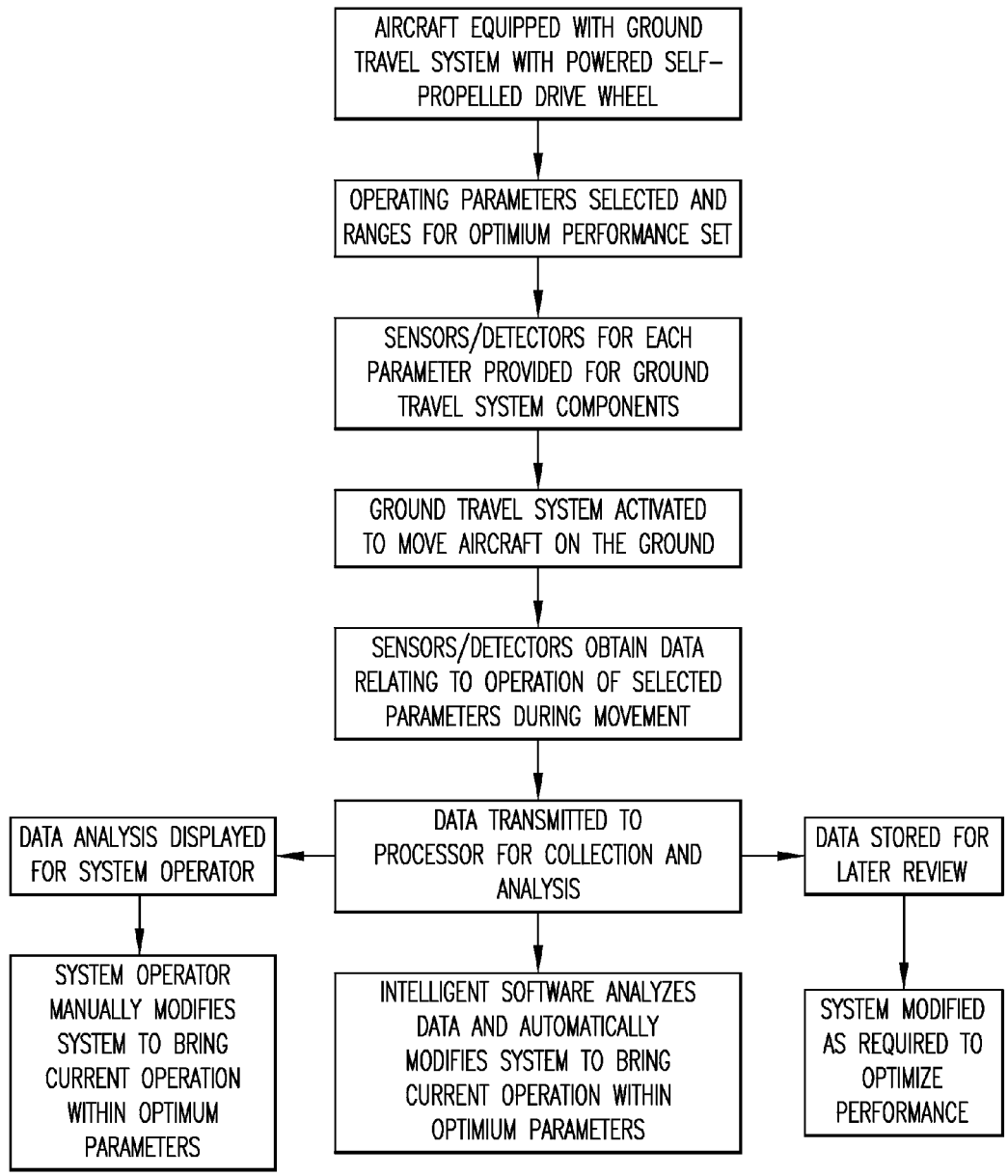
FIG. 3 is a flow chart illustrating a preferred sequence of steps for the method of the present invention.

FIG. 3 presents a flow chart illustrating one possible sequence of steps of the present method of optimizing ground travel system performance in an aircraft equipped with one or more self-propelled nose or main wheels powered by an electric driver or a drive means that moves an aircraft on the ground independently without assistance from the aircraft's engines or tow vehicles. The desired operating parameters and ranges for optimum performance are selected and set. Sensors and/or detectors and associated microprocessors or other electronics for each parameter are provided, preferably for the drive means and the wheel, but also for other ground travel system components as required. The ground travel system is activated to move the aircraft on the ground. The sensors or detectors obtain operating information and other data relating to the selected parameters while aircraft ground movement is controlled by the ground travel system. The information obtained by the sensors and/or detectors is transmitted to a processor for collection and analysis. Intelligent software in the processor automatically adjusts system operations and/or makes whatever modifications are required to optimize the system.

Information collected from the sensors and/or detectors may be stored and reviewed at a later time or it may be processed and transmitted to a ground travel system operator for review and manual adjustment, if the system does not include intelligent software and the capability to make adjustments to optimize the system automatically. In the first instance, the collected and stored data is reviewed at a later time, and the ground travel system is subsequently modified as required to optimize its performance during a future use. Data transmitted in real time to a system user can be used as the basis for taking whatever positive action is required during operation to modify the ground travel system manually to bring its current performance within optimum parameter ranges. Modification can occur irrespective of whether the system is in operation.

The present invention is described in terms of a functional block diagram, such as that depicted in FIG. 2 and various processing steps shown in the flow chart of FIG. 3. It should be appreciated that such functional blocks may be realized in many different forms of hardware, firmware, and/or software components configured to perform the various functions. For example, the method of the present invention may employ various integrated circuit components such as, for example, memory elements, digital signal processing elements, look-up tables, and the like, which may carry out a variety of functions under the control of one or more microprocessors or other control devices. Such general technologies are known to those skilled in the art and are not described in detail herein. Moreover, it should be understood that the exemplary process illustrated may include additional or fewer steps or may be performed in the context of a larger processing scheme. Furthermore, the methods presented in the description and drawings are not to be construed as limiting the order in which the individual processing steps may be performed. It should be appreciated that the particular implementations shown and described herein are illustrative of the invention and are not intended to limit the scope of the invention in any way.

INDUSTRIAL APPLICABILITY

The method of the present invention will find its primary for use with aircraft ground travel systems equipped with one or more powered self-propelled nose or main drive wheels, each powered wheel having a driver that is activated to rotate and self-propel the powered wheel, wherein it is desired to automatically or manually optimize operating performance of the ground travel system by monitoring selected operating parameters and taking the action required to ensure optimized operation of the system.

The invention claimed is:

1. A method for optimizing operation of an aircraft independent ground travel system comprising
   a. providing a ground travel system to power movement of the aircraft on the ground by electric drive motors mounted to drive each of a pair of aircraft nose wheels,
   b. selecting operating parameters from the group comprising wheel speed, electric drive motor speed, wheel torque, electric drive motor torque, direction of aircraft travel, electric drive motor component thermal data, aircraft location data, aircraft global positioning system (GPS) data, wheel electronics data, all operator inputs and commands, all feedback to operator, all system or component pings, all boot checks, and all status checks for the electric drive motors or selected components of the electric drive motors and ranges of optimized operation for said parameters and providing for each selected operating parameter a sensor or detector adapted to monitor and obtain information about the operating parameters, operation of the electric drive motors or the selected components of the electric drive motors,
   c. monitoring operation of each selected parameter while said ground travel system is operational to drive the aircraft on the ground to produce a set of data relating to each selected operating parameter, recording the set of data relating to each selected operating parameter, storing the recorded set of data, analyzing and reviewing the stored set of data,
   d. transmitting analyzed and reviewed data indicating selected operating parameters outside optimized ground travel operating ranges to a cockpit display where an operator of the ground travel system manually takes action required to return the selected operating parameters to ranges indicative of optimized ground travel in real time, and
   e. alternatively, automatically modifying operation of the ground travel system in real time or at a later time when the ground travel system is in operation as required to produce optimized operation of the electric drive motors or components of the electric drive motors as indicated by the analyzed and reviewed stored data.

2. The method described in claim 1, wherein the electric drive motors comprise electric motors capable of driving an aircraft on the ground selected from the group comprising high phase order electric motors, electric induction motors, permanent magnet brushless DC motors, and switched reluctance motors.

3. The method described in claim 1, further comprising automatically modifying operation of said ground travel system to optimize operation of said aircraft drive system to move the aircraft independently on the ground, to optimize operation of airport throughput, to optimize operation of aircraft ramp safety, to optimize operation of aircraft utilization, or to optimize operation of aircraft operating block time.

4. The method described in claim 1, further comprising analyzing and reviewing the stored data by intelligent software, and automatically modifying operation of the ground travel system in real time or at the later time to produce optimized operation of the ground travel system or electric drive motors as indicated by the analyzed and reviewed stored data.

5. A method for optimizing performance and efficient operation of an aircraft ground travel system with one or more aircraft nose or main drive wheels powered by one or more onboard drivers to move the aircraft independently on the ground, comprising:
   a. equipping an aircraft with a ground travel system comprising onboard drivers mounted in one or more nose or main wheels controllable to power said one or more nose or main wheels and drive the aircraft independently during ground travel;
   b. identifying, from a plurality of ground travel system or ground travel system component operating parameters comprising aircraft wheel speed, onboard driver speed, aircraft wheel torque, onboard driver torque, direction of aircraft travel, ground travel system component thermal data, aircraft location data, aircraft global positioning system (GPS) data, aircraft wheel electronics data, all ground travel system operator inputs and commands, all feedback to ground travel system operator, all ground travel system or ground travel system component pings, all ground travel system boot checks, and all ground travel system status checks, selected parameters and operating ranges for the selected parameters indicative of optimized ground travel system or ground travel system component operation while the aircraft is driven independently during ground travel;

c. providing for each of the selected operating parameters a sensor or detector adapted to measure, detect, or monitor the selected parameters and ground travel system or ground travel system component operation and obtain information relating to the selected parameter operating ranges;

d. driving the aircraft during ground travel with the ground travel system while the selected operating parameters are measured, detected, or monitored and information relating to the selected parameter operating ranges is being obtained;

e. communicating the information relating to the selected parameter operating ranges to a processor with software adapted to collect, store, and analyze the information relating to the selected parameter operating ranges and to control operation of the ground travel system and ground travel system components; and f. when the operating ranges for any of the selected parameters are analyzed and determined to be outside the operating ranges indicative of optimized ground travel system or ground travel system component operation, automatically controlling operation of the ground travel system or the ground travel system components as required so that operating ranges for all of the selected parameters indicate optimized operation of the ground travel system and ground travel system components.

6. The method described in claim 5, further comprising transmitting the information relating to any of the selected parameters outside the operating ranges indicative of optimized ground travel to a cockpit display accessible by an operator of the ground travel system.

7. The method described in claim 6, wherein the operator of the ground travel system reviews the displayed information relating to the selected parameters outside the operating ranges indicative of optimized ground travel and manually activates an operator interface to take action required to return the selected parameters to operating ranges indicative of optimized ground travel and to optimize the operation of the ground travel system or ground travel system components in real time.

8. The method described in claim 7, further comprising automatically or manually controlling operation of the ground travel system or ground travel system components so that operating ranges for all of the selected parameters indicate optimized operation of airport throughput, optimized operation of aircraft ramp safety, optimized operation of aircraft utilization, or optimized operation of aircraft operating block time.

9. The method described in claim 5, further comprising analyzing the information relating to the selected parameter operating ranges independently of the operation of the ground travel system.

10. The method described in claim 9, further comprising automatically controlling operation of the ground travel system or the ground travel system components to optimize system operation in real time or at a later time when the ground travel system is in operation.

11. The method described in claim 5, further comprising equipping the aircraft with onboard drivers comprising motors capable of driving an aircraft on the ground selected from the group comprising high phase order electric motors, electric induction motors, permanent magnet brushless DC motors, switched reluctance motors, hydraulic pump/motor assemblies, and pneumatic motors.

12. The method described in claim 11, further comprising locating the motors at selected locations comprising inside an aircraft nose or main wheel, adjacent to an aircraft nose or main wheel, within the aircraft, or attached to the aircraft airframe.

13. A system for optimizing operation and performance of an aircraft ground travel system in accordance with the method of claim 5, comprising:

(a) an aircraft equipped with onboard drivers located within or outside one or more aircraft nose or main drive wheels for powering said one or more aircraft nose or main wheels to move the aircraft independently on the ground;

(b) a plurality of sensors or detectors associated with said onboard drivers and said one or more drive wheels to monitor information relating to the operation and performance of said ground travel system during ground travel of said aircraft and transmit said information to a processor adapted to receive, collect, and analyze said information; and (c) software associated with said processor and said ground travel system adapted to analyze said information with respect to said selected operating parameters and automatically adjust said ground travel system to optimize operation and performance within said selected parameters.

* * * * *